United States Patent [19]
Rafeldt

[11] 3,848,841
[45] Nov. 19, 1974

[54] REFUSE CONTAINERS, PARTICULARLY FOR VEHICLES

[76] Inventor: Klaus Rafeldt, Grunlandweg 270, D 7181 Jagstheim, Germany

[22] Filed: Apr. 21, 1972

[21] Appl. No.: 246,280

[30] Foreign Application Priority Data
Apr. 23, 1971 Germany............................ 2120058

[52] U.S. Cl..................................... 248/99, 150/4
[51] Int. Cl............................................ B65b 67/12
[58] Field of Search.............. 248/99, 95, 100, 16 T, 248/46; 150/3, 4, 6; 229/53, 62

[56] References Cited
UNITED STATES PATENTS

| | | | |
|---|---|---|---|
| 518,574 | 4/1894 | Procter | 150/3 |
| 941,578 | 11/1909 | Ihme | 248/100 |
| 1,787,710 | 1/1931 | Wilson | 150/3 X |
| 2,483,844 | 10/1949 | Ranseen | 248/99 |
| 2,778,553 | 1/1957 | Satrom et al | 248/99 UX |
| 2,903,215 | 9/1959 | Metcalf | 248/99 |
| 3,329,382 | 7/1967 | Ryan | 248/99 |
| 3,426,958 | 2/1969 | Gore | 248/99 X |
| 3,724,921 | 4/1973 | Lake | 248/99 X |

FOREIGN PATENTS OR APPLICATIONS
1,288,503 1/1969 Germany............................ 248/99

*Primary Examiner*—Roy D. Frazier
*Assistant Examiner*—Rodney H. Bonck
*Attorney, Agent, or Firm*—Sughrue, Rothwell, Mion, Zinn & Macpeak

[57] ABSTRACT

A refuse container, particularly for vehicles, which comprises a bag provided with an open-ended pocket at its upper edge for push fitting on to two support arms which can be pivoted between spread apart and closed positions. The support arms are preferably each formed in two hinged parts. The bag may be a disposable bag of plastics material.

3 Claims, 3 Drawing Figures

PATENTED NOV 19 1974 3,848,841

REFUSE CONTAINERS, PARTICULARLY FOR VEHICLES

FIELD OF THE INVENTION

This invention relates to refuse containers, and particularly to refuse containers for use in vehicles.

Ash-trays are generally provided in vehicles during their manufacture, but such ash-trays are not suitable for holding discarded empty cigarette packets, paper, and the remains of food such as apple cores, due to their small volume. Such refuse is very often simply thrown from the windows of the vehicle.

DESCRIPTION OF THE PRIOR ART

In the pursuit of environmental cleanliness it is in consequence already known to provide passenger vehicles with rigid plastics material containers fixed at suitable positions in the vehicle and into which such refuse can be discarded. It has been found however that there is generally not sufficient space for the provision of such refuse containers, particularly in the smaller European-type of automobile. Moreover, such conventional refuse containers are open at the top and do not provide the desirable odour-proof sealing against odours which may be disagreeable to the occupants of the vehicle.

SUMMARY OF THE INVENTION

In consequence, it is an object of the present invention to provide a refuse container, particularly for use in vehicles, which avoids the above-mentioned disadvantages, which is of simple construction and easy to manufacture, and which has the facility for rendering it odour-proof.

In accordance with the present invention there is provided a refuse container comprising a waterproof and odour-proof bag provided with a pocket at its upper edge, and a bag holder comprising a stem and two arms pivotable relative to the stem, the pocket of the bag being open to permit the bag to be pushed on to the two arms.

Such refuse containers in accordance with the invention are suitable not only for use in motor vehicles but also find application for the same favourable reasons in omnibuses and aircraft for example, as travel sickness bags and/or refuse containers.

According to a preferred embodiment of the invention, each of the two arms comprises two parts connected by a hinge joint. Thus, the refuse container can be unfolded in a simple way.

For use of such refuse containers as travel sickness bags in omnibuses and aircraft it is preferable if the stem of the holder has a portion bent at an angle to the plane of the stem and if the bent portion of the stem is adapted to be removably fitted into a receiving member such as a retaining socket.

Refuse containers in accordance with the invention can also be fixed in a very simple manner to tables. In this case it is preferable if the stem of the bag holder is formed as a table clamp.

In order to permit disposal of the refuse in the most hygienic manner possible, it is preferred that the bag should be a disposable bag of plastics material.

BRIEF DESCRIPTION OF THE DRAWINGS

In order that the invention may be more fully understood, a preferred embodiment in accordance with the invention will now be described by way of example and with reference to the accompanying drawing, in which.

DESCRIPTION OF THE PREFERRED EMBODIMENT

Figure 1:
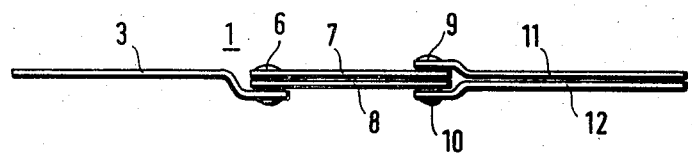
FIG. 1 is a side view of a bag holder.
Figure 2:
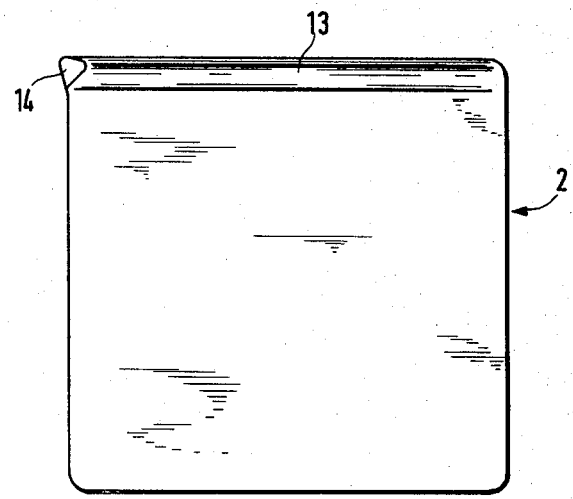
FIG. 2 is a side view of the bag which is to be fitted on to the holder of FIG. 1; and, FIG. 3 is a perspective view of the complete refuse container with the bag fitted on to the holder and in an open, receiving state.

As is shown in FIGS. 1 and 2, the refuse container of the present invention comprises a bag holder 1 and a bag 2.

The bag holder 1 shown in FIG. 1 comprises a stem 3 which is provided with two holes 4 and 5 which enable the stem to be secured to a suitable part of the bodywork of a vehicle. Two fork arms 7 and 8 are secured to one end of the stem 3 by means of a common riveted joint 6. These fork arms 7 and 8 are each provided with a further riveted joint 9 and 10 respectively at their ends remote from the riveted joint 6. Extension arms 11 and 12 are coupled to the fork arms 7 and 8 by the riveted joints 9 and 10 respectively and are capable of pivotal movement. As shown in FIG. 1, both the stem 3 and also the two extension arms 11 and 12 are cranked in the region of the riveted joints 6, 9, 10 so that the bag holder 1 has a substantially flat overall configuration.

As is shown in FIG. 2, the bag 2 is provided at its upper edge with a pocket 13 which extends around its periphery. The pocket 13 is provided with an opening or gap 14 in the region of a corner of the bag. This opening or gap 14 is formed in such a way that the bag 2 can be pushed on to the support arms formed by the fork arms 7 and 8 and the extension arms 11 and 12.

Figure 3:
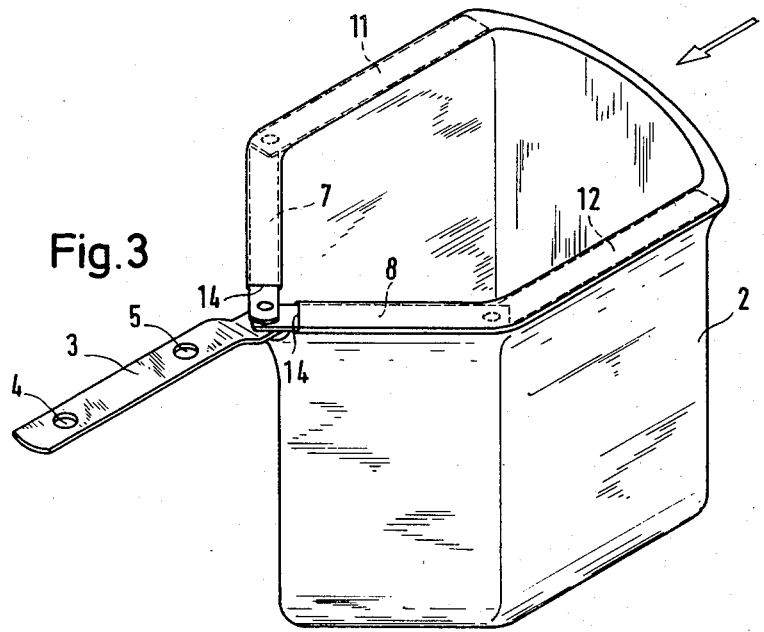

The way in which the refuse container is adapted to be used will be most clearly understood from FIG. 3.

The stem 3 of the holder is secured, for example by screws, by using the two holes 4 and 5. The two support arms 7, 11; 8, 12 with the bag 2 fitted thereon are squeezed together to lie in overlapping relationship when the container is not in use and can be pivoted to one side and out of the way beneath the dash-board.

When a passenger wishes to use the refuse container the two support arms 7, 11; 8, 12 and the bag 2 held thereon are pivoted out from beneath the dash-board for example, and the two support arms are then spread apart to take up a position as shown in FIG. 3. The bag 2 is thereby opened so that refuse can be placed into the bag.

Finally, the two support arms 7, 11; 8, 12 can again be squeezed together so that the bag 2 is closed and rendered odour-proof in the desired way. Thereafter, the closed bag 2 and the two support arms may be pivoted about the joint 6 so that the bag 2 is again disposed beneath the dash-board.

Although the bag holder 1 is preferably made of metal, it should be appreciated that it can alternatively be made of a plastics material. In the latter case, suitable reinforcement may have to be provided in order that the holder should have the necessary rigidity.

The bag 2 is preferably made of plastics material and the pocket can then be formed by a welding operation.

However, it should be understood that a rubberised fabric could be used instead of a plastics material, in which case the bag pocket 13 could be made by sewing or by the use of an adhesive.

As mentioned above, the containers of the present invention may also be used for example as travel sickness bags in omnibuses and aircraft. In this case, the stem of the bag holder 1 must be modified in an appropriate way. In order to provide for a releasable mounting of the bag holder 1 on the back of the seat of the person in front a suitable bracket or socket may be provided on the seat back, into which a downwardly bent portion of the holder stem 3 can be slotted. In fitting such containers into vehicles of any type care must be taken that the joints of the bag holder 1 are made as light-weight as possible. This must be so in order that even with the support arms pivoted out of the way there is no danger of passengers being injured by the containers in the event of an accident or sudden deceleration. The bag holder 1 of the refuse container of the present invention may also be formed in such a way that the container can be fitted to tables, particularly conference tables. In this case it is desirable that a clamp, such as a screw clamp, is provided at the free end of the stem of the holder, so that the refuse container can be secured easily to the table top.

The bags 2 of the refuse container of the present invention are preferably formed as disposable bags in order to ensure the disposal of the refuse in the most hygienic manner possible.

What is claimed is:

1. In a collapsible frame structure for supporting a refuse bag of the type having a pocket around its upper edge and an opening in said pocket, the frame structure including two fork arms coupled at one end by a pivot joint and insertable at their other ends into the pocket on opposite sides of the bag through the opening, the fork arms being laterally displaceable from each other to thereby open the mouth of the bag, the improvements characterized by:

a. an elongated stem member adapted to be secured at one end to a mounting structure, such as the dashboard of a motor vehicle, and having a hole at the other end for receiving a hinge pin;

b. each fork arm having first and second arm members pivotally joined together at a first end, each of the second arm members have offset crank portions at their pivotal joint ends one of said second arm members being offset downwardly, the other of said second arms being offset upwardly such that the second arms are vertically disposed with respect to each other to thereby dimensionally minimize the space occupied by the frame structure when collapsed;

c. holes in each second end of the first arm members, and d. a hinge pin pivotally extending through the hole in the stem member and the holes in the first arm members to join said first arm members to said stem such that the first arms are vertically disposed with respect to each other and thereby from a common joint to render the fork arms laterally displaceable from each other over a wide-angle relative to the stem member.

2. A frame structure as defined in claim 1, wherein the pivotal joints between the arm members are substantially parallel to the hinge pin.

3. A frame structure as defined in claim 1, wherein the stem member has an offset crank portion at the pivotal joint end.

* * * * *